US006927898B2

(12) United States Patent
Yeniay et al.

(10) Patent No.: US 6,927,898 B2
(45) Date of Patent: Aug. 9, 2005

(54) ULTRA-WIDE BANDWIDTH OPTICAL AMPLIFIER

(75) Inventors: Aydin Yeniay, Stafford, PA (US); Renyuan Gao, Downingtown, PA (US)

(73) Assignee: Photon-X, LLC, Malvern, PA (US)

( * ) Notice: Subject to any disclaimer, the term of this patent is extended or adjusted under 35 U.S.C. 154(b) by 286 days.

(21) Appl. No.: 10/218,694

(22) Filed: Aug. 14, 2002

(65) Prior Publication Data
US 2003/0133183 A1 Jul. 17, 2003

Related U.S. Application Data

(60) Provisional application No. 60/312,580, filed on Aug. 15, 2001, and provisional application No. 60/325,407, filed on Sep. 26, 2001.

(51) Int. Cl.[7] .............................................. H01S 3/00
(52) U.S. Cl. ...................................... 359/349; 359/333
(58) Field of Search ................................... 359/349, 333

(56) References Cited

U.S. PATENT DOCUMENTS

| | | |
|---|---|---|
| 4,767,174 A | 8/1988 | Carenco et al. |
| 4,796,975 A | 1/1989 | Lukas et al. |
| 5,150,440 A | 9/1992 | Booth |
| 5,292,620 A | 3/1994 | Booth et al. |
| 5,359,687 A | 10/1994 | McFarland et al. |
| 5,369,520 A | 11/1994 | Avramopoulos et al. |
| 5,402,514 A | 3/1995 | Booth et al. |
| 5,497,445 A | 3/1996 | Imoto |
| 5,712,937 A | 1/1998 | Asawa et al. |
| 5,887,093 A | 3/1999 | Hansen et al. |
| 5,905,838 A | 5/1999 | Judy et al. |
| 5,974,214 A | 10/1999 | Shacklette et al. |
| 5,978,130 A | 11/1999 | Fee et al. |
| 5,991,493 A | 11/1999 | Dawes et al. |
| 6,049,417 A | 4/2000 | Srivastava et al. |
| 6,049,418 A | 4/2000 | Srivastava et al. |
| 6,101,016 A | 8/2000 | Roberts et al. |
| 6,125,225 A | 9/2000 | Dianov et al. |
| 6,141,142 A | 10/2000 | Espindola et al. |
| 6,259,555 B1 | 7/2001 | Meli et al. |
| 6,307,668 B1 * | 10/2001 | Bastien et al. ............ 359/337.1 |
| 6,501,597 B1 * | 12/2002 | Pitt et al. ..................... 359/349 |
| 6,693,738 B2 * | 2/2004 | Islam .......................... 359/334 |
| 6,781,750 B2 * | 8/2004 | Feillens et al. ............. 359/343 |

FOREIGN PATENT DOCUMENTS

WO    WO 01/06682 A1 *  1/2001

OTHER PUBLICATIONS

Eskildsen, L., Goldstein, E.L., Chang, G.E., Iqbal, M.Z., and Lin C.; "Self–Regulating WDM Amplifier Module for Scalable Lightwave Networks"; IEEE Photonics Technology Letters; Nov. 1994; pp. 1321–1323; vol. 6, No. 11; USA.

(Continued)

*Primary Examiner*—Mark Hellner
(74) *Attorney, Agent, or Firm*—Joseph E. Maenner; Monte & McGraw, P.C.

(57) ABSTRACT

A broadband optical amplifier is disclosed. The amplifier includes an input having a plurality of optical wavelengths, including optical wavelengths between 1610 and 1620 nanometers, and a first optical splitter optically connected to the input. The first optical splitter splits the input into a first band signal portion, a second band signal portion, and a third band signal portion. An amplifying portion is optically disposed along each of the first, second, and third band signal portions optically downstream from the first optical splitter. A first optical combiner is optically connected to the first, second, and third band signal portions to form an output. A method of amplifying a broadband optical signal is also disclosed.

25 Claims, 6 Drawing Sheets

OTHER PUBLICATIONS

Masuda, H., Kawai, S., and Aida, K.; "Wideband Erbium–doped Fibre Amplifiers with Three–Stage Amplification"; Electronics Letters; Mar. 19, 1998; vol. 34, No. 6.

Kawai, S., Masuda, H., Suzuki, K.–I., and Aida, K; "Ultra–wide, 75nm 3dB Gain–band Optical Amplifier Utilising Gain–Flattened Erbium–doped Fluoride Fibre Amplifier and Discrete Raman Amplification"; Electronics Letters; Apr. 30, 1998; vol. 34 No. 9.

Masuda, H., Kawai, S., and Aida, K., "Ultra–wideband Hybrid Amplifier Comprising Distributed Raman Amplifier and Erbium–doped Fibre Amplifier"; Electronics Letters; Jun. 25, 1998; vol. 34 No. 13.

Yamada, M., Ono, H., and Ohishi, Y.; "Gain Flattened Boadband $Er^{3+}$–doped Silica Fibre Amplifier with Low Noise Characteristics"; Electronics Letters; Sep. 3, 1998; vol. 34 No. 18.

Yamada, M., Ono, H., and Ohishi, Y.; "Low–noise Broadband $Er^{3+}$–doped Silica Fibre Amplifiers",;Electronics Letters; Jul. 23, 1998; vol. 34 No. 15.

Bayart, D., Baniel, P., Bergonzo, A., Boniort, J.–Y., Bousselet, P., Gasca, L., Hamoir, D., Leplingard, F., Le Sauze, A., Nouchi, P., Roy, F., and Sillard, P.; "Broadband Optical Fibre. Amplification over 17.7THz Range"; Electronics Letters; Aug. 31, 2000; vol. 36 No. 18.

* cited by examiner

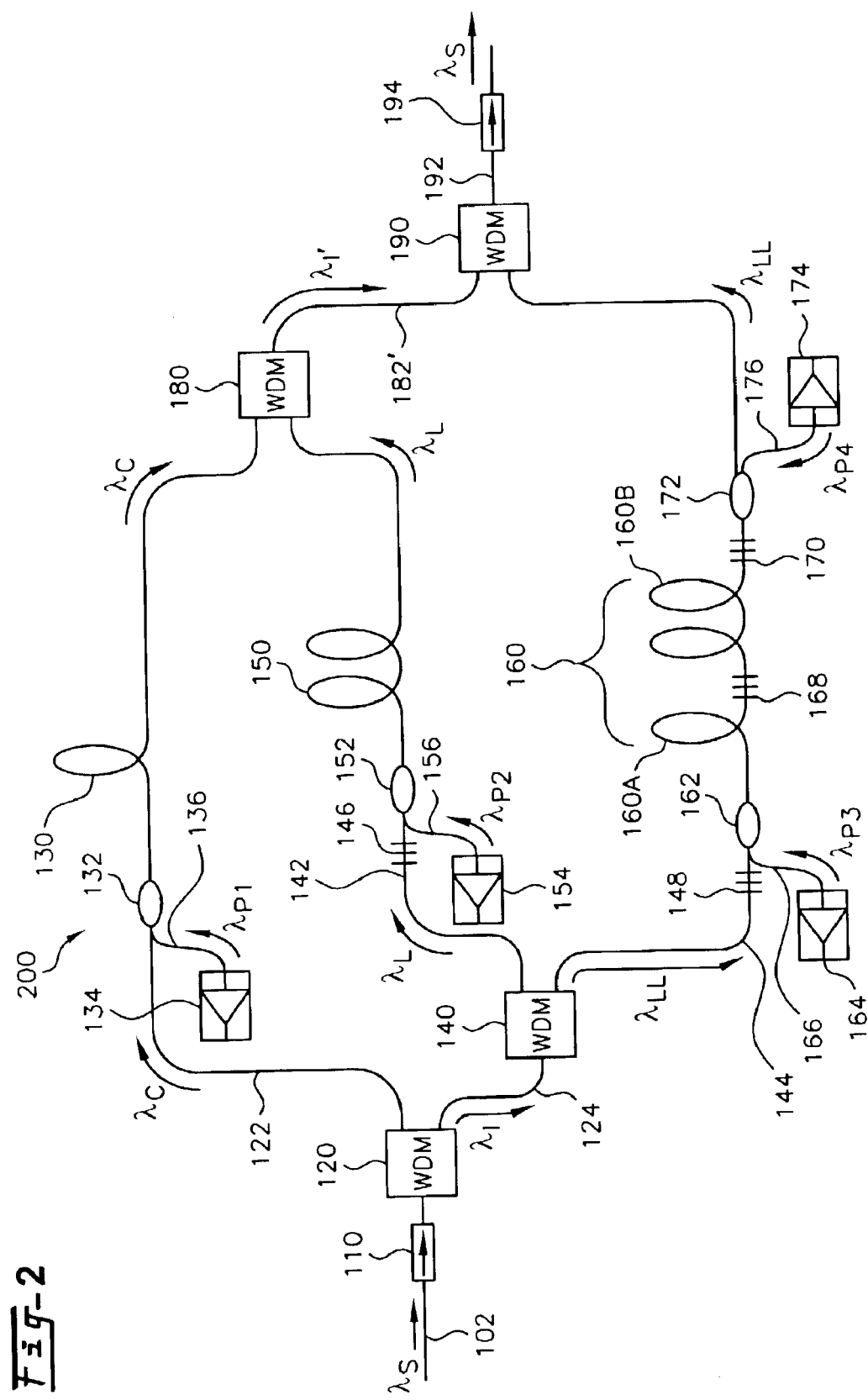

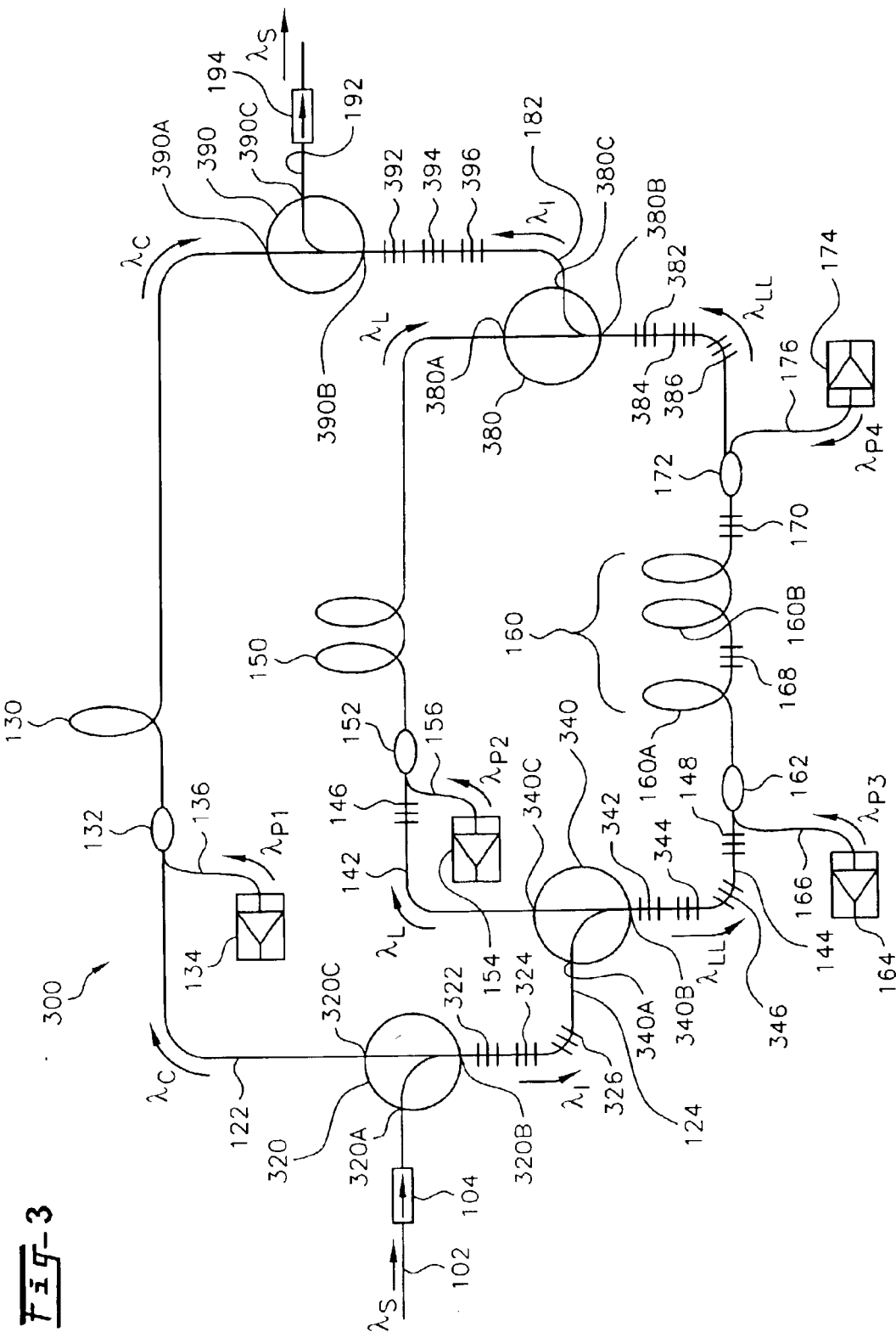

ULTRA-WIDE BANDWIDTH OPTICAL AMPLIFIER

CROSS-REFERENCE TO RELATED APPLICATIONS

This application claims the benefit of U.S. Provisional Application No. 60/312,580, filed 15 Aug. 2001, and U.S. Provisional Application No. 60/325,407, filed 26 Sep. 2001.

FIELD OF THE INVENTION

The present application relates to optical amplifiers that amplify optical signals over a broad bandwidth.

BACKGROUND OF THE INVENTION

Conventional erbium doped fiber amplifiers (EDFA) have been extensively used in optical telecommunications as means to amplify weak optical signals in the third telecommunication window (near 1550 nm) between telecommunication links. Much work has been done on the design of these amplifiers to provide efficient performance, such as high optical gain and low noise figure. However, with the recent enormous growth of data traffic in telecommunications, owing to the Internet, intranets, and e-commerce, new optical transmission bandwidths are required to provide increased transmission capacity in dense wavelength division multiplexing (DWDM) systems.

There are a few solutions to this demand. One proposed solution is to utilize new materials compositions as a host for the fiber gain medium (instead of silica), such as telluride, which may provide broader amplification bandwidth (up to 80 nm). However, the non-uniform gain shape and poor mechanical properties of telluride glass make these amplifiers difficult to implement in telecommunication systems. Also, Raman amplifiers can be considered as an alternative solution to high bandwidth demand, since these amplifiers are capable of providing flexible amplification wavelength with a broad bandwidth. However, these amplifiers place restrictions on optical system architectures because of their required designs for efficient performance, such as long fiber length (>5 km), high pump power (>500 mW) and co-pumping configurations. On the other hand, relatively long erbium doped fibers (EDFs) may also provide amplification in the long wavelength range (1565–1620 nm) when they are used with high power pump sources. This range is commonly called "L band", which can be further subdivided in a 1565–1605 nm range and a 1605 nm and greater range, which is referred to as "ultra-L band". The conventional range, currently being used for most commercial applications, also known as "C band", is in the wavelength range between 1520–1565 nm.

With the need to increase transmission capacity to accommodate the rapid growth of optical telecommunications, the industry is looking to L band and possibly ultra-L band as solutions to this need. However, in order to amplify C band, L band, and ultra-L band signals, multiple amplifiers are currently required. It would be beneficial to provide a single optical amplifier that amplifies a light signal over a large bandwidth encompassing C band, L band, and ultra-L band light.

BRIEF SUMMARY OF THE INVENTION

Briefly, the present invention provides a broadband optical amplifier comprising an input having a plurality of optical wavelengths, including optical wavelengths between 1610 and 1620 nanometers and a first optical splitter optically connected to the input. The first optical splitter splits the input into a first band signal portion, a second band signal portion, and a third band signal portion. The amplifier further comprises an amplifying portion optically disposed along each of the first, second, and third band signal portions optically downstream from the first optical splitter and a first optical combiner optically connected to the first, second, and third band signal portions to form an output.

Additionally, the present invention provides a method of amplifying a broadband signal comprising providing a broadband optical signal having a plurality of optical wavelengths, including optical wavelengths between 1610 and 1620 nanometers; splitting the broadband optical signal into first, second, and third optical signals; separately amplifying each of the first, second, and third optical signals; and combining the first, second, and third optical signals into an amplified broadband optical signal.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 2 is a schematic view of an optical amplifier according to a second embodiment of the present invention.

FIG. 3 is a schematic view of an optical amplifier according to a third embodiment of the present invention.

DETAILED DESCRIPTION OF THE INVENTION

Figure 1:
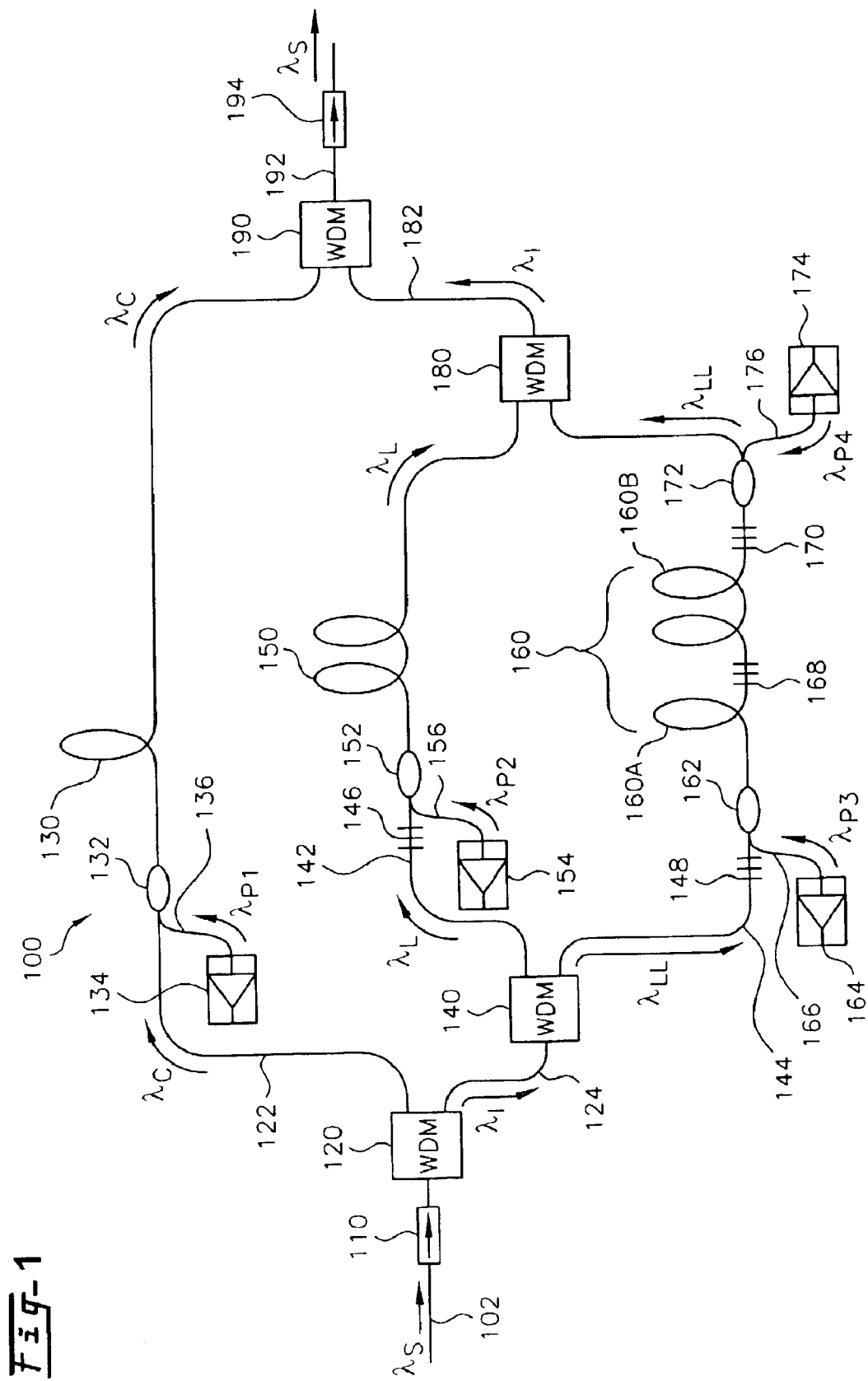
FIG. 1 is a schematic view of an optical amplifier according to a first embodiment of the present invention.

In the drawings, like numerals indicate like elements throughout. Reference is made to U.S. patent application Ser. No. 09/888,880 and U.S. patent application Ser. No. 09/888,881, both of which were filed on Jun. 25, 2001, are owned by the assignee of the present invention, and are incorporated herein by reference in their entireties. As used herein, when two or more elements are "optically connected", light can be transmitted between the elements. Further, a second element is "optically downstream" of a first element when a light being transmitted through the first and second elements encounters the first element prior to encountering the second element. Also, "backward" is defined to mean a direction optically from a receiver toward a transmission source and "forward" is defined to mean a direction optically from the transmission source toward the receiver.

Referring to FIG. 1, an ultra-wide bandwidth optical amplifier 100 is disclosed. The optical amplifier 100 amplifies a broadband signal light $\lambda_S$ that extends across at least 100 nanometers, and preferably approximately 110 nanometers, preferably from between approximately 1510 to 1620 nanometers, although those skilled in the art will recognize that the band can be greater than 110 nanometers wide and can begin at less than 1510 nanometers and/or extend to greater than 1620 nanometers. Preferably, the signal light $\lambda_S$ includes C band signal light $\lambda_C$ (between approximately 1510–1565 nanometers), L band signal light $\lambda_L$ (between approximately 1565 and 1605 nanometers) and ultra-L band signal light $\lambda_{LL}$ (between approximately 1605 and 1620 nanometers).

The amplifier 100 includes an input 102 where the signal light $\lambda_S$ enters the amplifier 100 from a transmission source (not shown). A first optical isolator 110 is optically connected to the input 102 optically downstream from the transmission source. The first optical isolator 110 prevents optical noise from traveling backwards from the amplifier 100 toward the transmission source. A first optical splitter 120, preferably a wavelength division multiplexer (WDM) is optically connected to the first optical isolator 110.

Preferably, the first optical splitter 120 splits the input 102 into two lines, a first signal line 122 and a second signal line 124. The first signal line 122 is optically connected to a first amplifying portion 130. Preferably, the first amplifying portion 130 is a rare earth doped medium, such as a fiber or a planar waveguide. Also preferably, the first amplifying portion 130 is approximately fifteen meters long. A first optical multiplexer 132 optically connects an amplifying power source, preferably a first pump laser 134, to the first amplifying portion 130 via a pump line 136. Preferably, the first pump laser 134 is a 980 nanometer pump and has a power of approximately 90 mW, although those skilled in the art will recognize that the first pump laser 134 can be other than 980 nanometers and have a power of other than 90 mW.

The second signal line 124 is optically connected to a second WDM 140, which splits the second signal line 124 into a third signal line 142 and a fourth signal line 144. The third signal line 142 is optically connected to a second amplifying portion 150. Preferably, the second amplifying portion 150 is a rare earth doped medium, such as a fiber or a planar waveguide. Also preferably, the second amplifying portion 150 is approximately sixty meters long. A second optical multiplexer 152 optically connects an amplifying power source, preferably a second pump laser 154, to the second amplifying portion 150 via a pump line 156. Preferably, the second pump laser 154 is a 980 nanometer pump and has a power of approximately 180 mW, although those skilled in the art will recognize that the second pump laser 154 can be other than 980 nanometers and have a power of other than 180 mW. Also preferably, a reflector 146 is optically disposed in the third signal line 142. The reflector 146 can be a fiber grating or other reflector designed to reflect predetermined wavelengths. In a preferred embodiment, the reflector 146 reflects light having a wavelength of approximately 1560 nanometers, although those skilled in the art will recognize that the reflector 146 can reflect light having other wavelengths.

The fourth signal line 144 is optically connected to a third amplifying portion 160. Preferably, the third amplifying portion 160 is a rare earth doped medium, such as a fiber or a planar waveguide. Also preferably, the third amplifying portion 160 is approximately one hundred and twenty meters long. A third optical multiplexer 162 optically connects an amplifying power source, preferably a third pump laser 164, to the third amplifying portion 160 via a pump line 166. Preferably, the third pump laser 164 is a 980 nanometer pump and has a power of approximately 200 mW, although those skilled in the art will recognize that the third pump laser 164 can be other than 980 nanometers and have a power of other than 200 mW. Also preferably, a reflector 148 is optically disposed in the signal line 144. The reflector 148 can be a fiber grating or other reflector designed to reflect predetermined wavelengths. In a preferred embodiment, the reflector 148 reflects light having a wavelength of approximately 1560 nanometers, although those skilled in the art will recognize that the reflector 148 can reflect light having other wavelengths.

Also, preferably, the third amplifying portion 160 can be comprised of a plurality of amplifying sections 160a, 160b, with at least one reflector 168 optically disposed between the amplifying sections 160a, 160b. An auxiliary power source in the form of a fourth pump laser 174 is optically connected to a fourth optical multiplexer 172 optically downstream of the third amplifying portion 160 via a pump line 176. Preferably, fourth pump laser 174 is a 980 nanometer pump and has a power of approximately 200 mW, and is disposed to provide counter-pumping for the amplifying portion 160, although those skilled in the art will recognize that the fourth pump laser 174 can be other than 980 nanometers and have a power of other than 200 mW. Also preferably, a reflector 170 is optically disposed in the signal line 144 optically downstream of the third amplifying portion 160. The reflector 170 can be a fiber grating or other reflector designed to reflect predetermined wavelengths. In a preferred embodiment, the reflector 170 reflects light having a wavelength of approximately 1555 nanometers, although those skilled in the art will recognize that the reflector 148 can reflect light having other wavelengths.

A first optical combiner 180 is disposed optically downstream of the second and third amplifying portions 150, 160 and combines the third signal line 142 and the fourth signal line 144 to form an intermediate signal line 182. A second optical combiner 190 is disposed optically downstream from the amplifying portion 130 and the first optical combiner 180 and combines the intermediate signal line 182 and the first signal line 122 to form the amplifier output 192, disposed optically downstream of the second optical combiner 190. A second optical isolator 194 is optically disposed along the amplifier output 192. The second optical isolator 192 prevents optical noise from traveling backwards to the amplifier 100 from a receiver (not shown) disposed optically downstream of the amplifier 100.

A second embodiment optical amplifier 200 of the present invention is shown schematically in FIG. 2. The second embodiment is generally identical to the first embodiment, with the exception that the first optical combiner 180 is disposed optically downstream of the first and second amplifying portions 130, 150 and combines the first signal line 122 and the third signal line 142 to form an intermediate signal line 182'. The second optical combiner 190 is disposed optically downstream from the third amplifying portion 160 and the first optical combiner 180 and combines the intermediate signal line 182' and the fourth signal line 144 to form the amplifier output 192, disposed optically downstream of the second optical combiner 190.

Operation of the first embodiment amplifier 100 will now be described. The broadband signal light $\lambda_S$, having a spectrum of approximately between 1520 and 1620 nm, is provided to the input 102 from the transmission source (not shown). The signal light $\lambda_S$ travels through the optical isolator 110 and to the first optical splitter 120. The first optical splitter 120 splits the signal light $\lambda_S$ into the C band signal light $\lambda_C$ and an intermediate band signal light $\lambda_I$. The C band signal light $\lambda_C$ is transmitted along the signal line 122 to the first optical multiplexer 132, where first pump light $\lambda_{P1}$, generated by the first pump laser 134 and transmitted along the pump line 136, joins the C band signal light $\lambda_C$.

The combined C band signal light $\lambda_C$ and first pump light $\lambda_{P1}$ are transmitted along the first amplifying portion 130 where the C band signal light $\lambda_C$ is amplified. As light amplification by means of pumping a signal in a rare earth doped medium is well known to those skilled in the art, a detailed description of the physics of light amplification by this method will be omitted.

The intermediate band signal light $\lambda_I$ is transmitted along the signal line 124 to the second optical splitter 140. The second optical splitter 140 splits the intermediate band signal light $\lambda_I$ into the L band signal light $\lambda_L$ and the ultra-L band signal light $\lambda_{LL}$. The L band signal light $\lambda_L$ is transmitted along the signal line 142 to the second optical multiplexer 152, where second pump light $\lambda_{P2}$, generated by the second pump laser 154 and transmitted along the pump line 156, joins the L band signal light $\lambda_L$.

The combined L band signal light $\lambda_L$ and second pump light $\lambda_{P2}$ are transmitted along the second amplifying portion 150 where the L band signal light $\lambda_L$ is amplified. Backward ASE, generated during amplification of the L band signal light $\lambda_L$, is transmitted from the second amplifying portion 150 along the signal line 142 optically toward the second optical splitter 140, but is reflected by the reflector 146 back into the second amplifying portion 150. The ASE acts as a seed to supplement the pump power of the second pump laser 154, increasing the amplification of the L band signal light $\lambda_L$.

After being split by the second optical splitter 140, the ultra-L band signal light $\lambda_{LL}$ is transmitted along the signal line 144 to the third optical multiplexer 162, where third pump light $\lambda_{P3}$, generated by the third pump laser 164 and transmitted along the pump line 166, joins the ultra-L band signal light $\lambda_{LL}$.

The combined ultra-L band signal light $\lambda_{LL}$ and third pump light $\lambda_{P3}$ are transmitted along the third amplifying portion 160 where the ultra-L band signal light $\lambda_{LL}$ is amplified. Backward ASE, generated during amplification of the ultra-L band signal light $\lambda_{LL}$, is transmitted from the third amplifying portion 160 along the signal line 142 optically toward the second optical splitter 140, but is reflected by the reflector 148 back into the third amplifying portion 160. The ASE acts as a seed to supplement the pump power of the third pump laser 164, increasing the amplification of the ultra-L band signal light $\lambda_{LL}$.

The fourth pump laser 174 is connected to the fourth signal line 144 by the pump line 176 and the fourth optical multiplexer 172, which is optically disposed in the fourth signal line 144 optically downstream of the amplifying portion 160. The fourth pump laser 174 provides a fourth pump light $\lambda_{P4}$ to counter pump the fourth amplifying portion 160. Forward ASE, generated during amplification of the ultra-L band signal light $\lambda_{LL}$ by the counter-pumping, is transmitted from the third amplifying portion 160 along the signal line 144 optically toward the first optical combiner 180, but is reflected by the reflector 170 back into the third amplifying portion 160. The ASE acts as a seed to supplement the pump power of the fourth pump laser 174, increasing the amplification of the ultra-L band signal light $\lambda_{LL}$. The grating 168 suppresses further ASE in the signal line 144.

After amplification, the L band signal light $\lambda_L$ and the ultra-L band signal light $\lambda_{LL}$ are combined by the first optical combiner 180 to form amplified intermediate signal light $\lambda_I$, which is transmitted along the intermediate signal line 182. The intermediate signal light $\lambda_I$ and the C band signal light $\lambda_C$ are then combined by the second combiner 190 to reform the signal light $\lambda_S$, now amplified, which is transmitted along the amplifier output 192, the second optical isolator 194, and out of the amplifier 100.

Operation of the second embodiment of the amplifier 200 is similar to the operation of the first embodiment of the amplifier 100 with the exception that, after amplification, the C band signal light $\lambda_C$ is combined with the L band signal light $\lambda_L$ at the first optical combiner 180 to form an intermediate band signal light $\lambda_I$. The intermediate band signal light $\lambda_I$ is then combined with the ultra-L band signal light $\lambda_{LL}$ at the second optical combiner 190 to reform the signal light $\lambda_S$, now amplified.

Figure 2A:
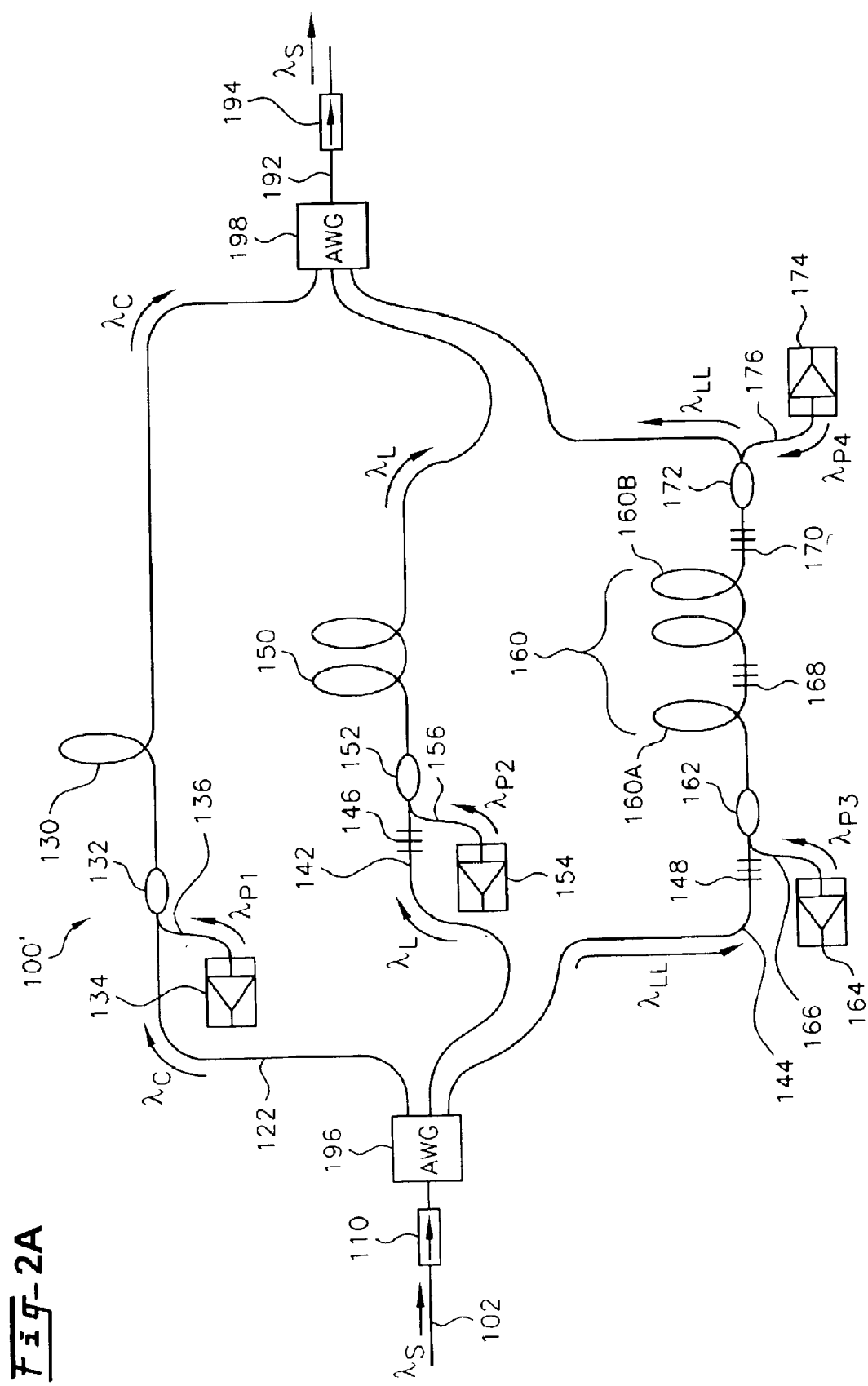
FIG. 2A is a schematic view of an optical amplifier according to a second embodiment of the present invention.

Although FIGS. 1 and 2 show separate optical splitters 120, 140 and separate optical combiners 180, 190, those skilled in the art will recognize that alternative means for splitting the signal light $\lambda_S$ can be used. For example, referring to FIG. 2A, an optical amplifier 100' uses an arrayed waveguide grating (AWG) 196 in the place of the optical splitters 120, 140 and an AWG 198 in place of the optical combiners 180, 190. Whereas the optical splitter 120 shown in FIGS. 1 and 2 splits the signal light $\lambda_S$ into the C band signal light $\lambda_C$ and the intermediate band signal light $\lambda_I$, and the optical splitter 140 subsequently splits the intermediate band signal light $\lambda_I$, into the L band signal light $\lambda_L$ and the ultra-L band signal light $\lambda_{LL}$, the AWG 196 generally simultaneously splits the signal light $\lambda_S$ into the C band signal light $\lambda_C$, the L band signal light $\lambda_L$, and the ultra-L band signal light $\lambda_{LL}$, eliminating the need for the intermediate band signal light $\lambda_I$. Similarly, the AWG 198 generally simultaneously combines the C band signal light $\lambda_C$, the L band signal light $\lambda_L$, and the ultra-L band signal light $\lambda_{LL}$, also eliminating the need for the intermediate band signal light $\lambda_I$.

A third embodiment optical amplifier 300 of the present invention is shown schematically in FIG. 3. The amplifier 300 is similar to the amplifier 100, with the exception that, instead of optical splitters 120, 140 and optical combiners 180, 190, optical circulators are used in conjunction with reflectors.

A first optical circulator 320 replaces the first optical splitter 120 and is disposed optically downstream of the first optical isolator 110. The first optical circulator 320 has an input 320a optically connected to the input 102, an input/output 320b optically connected to the signal line 124, and an output 320c optically connected to the signal line 122. A plurality of reflectors 322, 324, 326 are disposed optically downstream of the input/output 320b.

A second optical circulator 340 replaces the second optical splitter 130 and is disposed optically downstream of the input/output 320b of the first optical isolator 320. The second optical circulator 340 has an input 320a optically connected to the input/output 320b, an input/output 340b optically connected to the third amplifying portion 160, and an output 340c optically connected to the amplifying portion 150. A plurality of reflectors 342, 344, 346 are disposed optically downstream of the input/output 340b.

A third optical circulator 380 replaces the first optical combiner 180 and is disposed optically downstream of the second and third amplifying portions 150, 160. The third optical circulator 380 has an input 380a optically connected to the second amplifying portion 150, an input/output 380b optically connected to the third amplifying portion 160, and an output portion 380c optically connected to the intermediate signal line 182. A plurality of reflectors 382, 384, 386 are disposed optically downstream of the input/output 380b.

A fourth optical circulator 390 replaces the second optical combiner 190 and is disposed optically downstream of the first amplifying portion 130 and the third optical circulator 380. The fourth optical circulator 390 has an input 390a optically connected to the first amplifying portion 130, an input/output 390b optically connected to the intermediate signal line 182, and an output portion 390c optically connected to the output 192. A plurality of reflectors 392, 394, 396 are disposed optically downstream of the input/output 390b.

Figure 4:
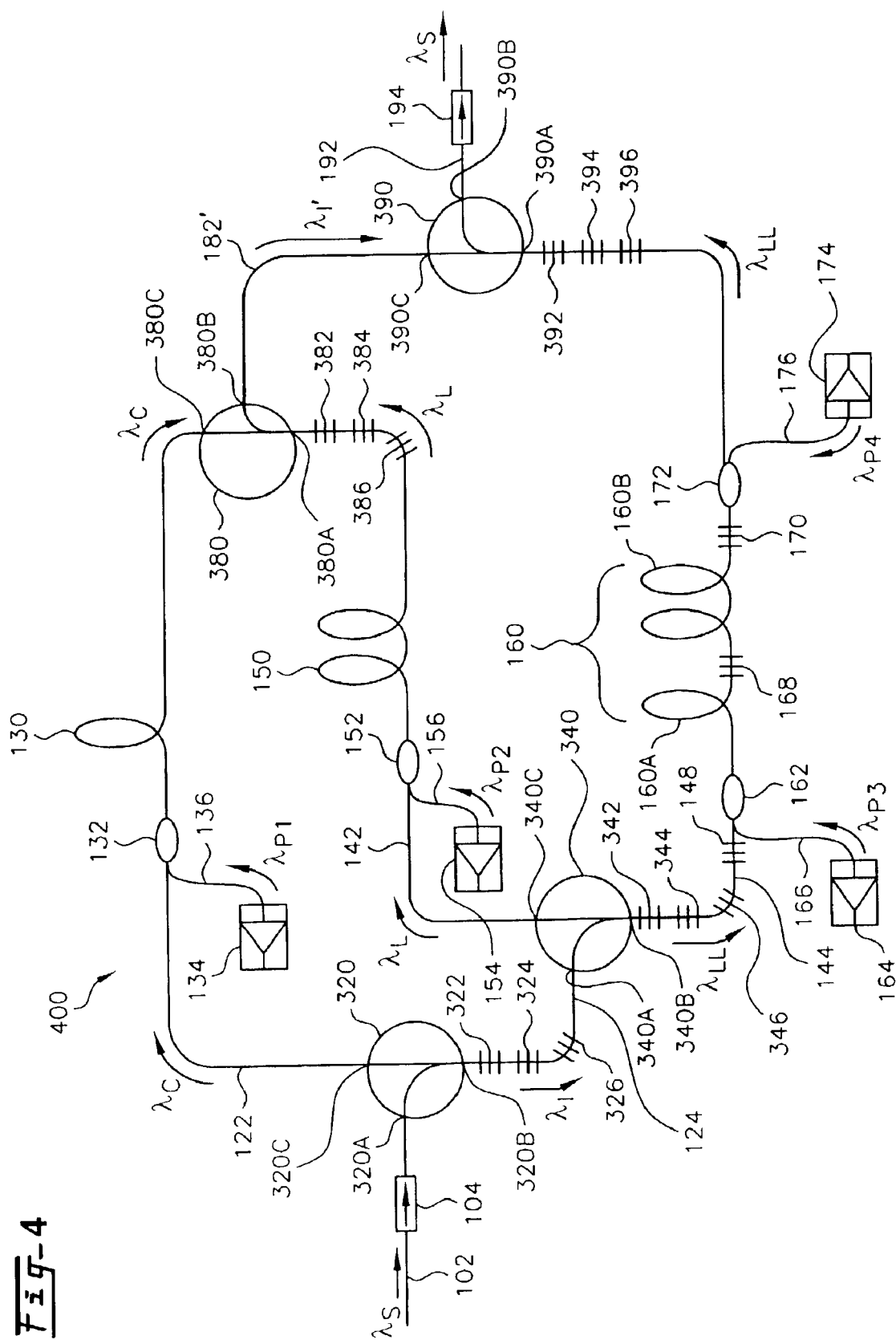
FIG. 4 is a schematic view of an optical amplifier according to a fourth embodiment of the present invention.

A fourth embodiment optical amplifier 400 of the present invention is shown schematically in FIG. 4. The fourth embodiment is generally identical to the third embodiment, with the exception that the third optical circulator 380 is disposed optically downstream of the first and second amplifying portions 130, 150 and combines the first signal line 122 and the third signal line 142 to form an intermediate signal line 182'. The fourth optical circulator 390 is disposed optically downstream from the third amplifying portion 160 and the third optical circulator 380 and combines the intermediate signal line 182' and the fourth signal line 144.

Operation of the third and fourth embodiments 300, 400 are as follows. The broadband signal light $\lambda_S$ is provided to the amplifier 300 from the transmission source. The signal light $\lambda_S$ enters the input 102 and is transmitted through the first optical isolator 110. The signal light $\lambda_S$ enters the first optical circulator 320 at the input 320a and exits at the input/output 320b. The signal light $\lambda_S$ encounters the reflectors 322, 324, 326, where predetermined wavelengths, particularly C band signal light $\lambda_C$, are reflected by the reflectors 322, 324, 326 back into the first optical circulator 320 at the input/output 320b, through the first optical circulator 320 and out through the output 320c. The C band signal light $\lambda_C$ is transmitted along the signal line 122 where the C band signal light $\lambda_C$ is amplified as described above.

The remaining intermediate band signal light $\lambda_I$ not reflected by the reflectors 322, 324, 326, particularly L band signal light $\lambda_L$ and ultra-L band signal light $\lambda_{LL}$, is transmitted along the signal line 124 to the second optical circulator 340. The intermediate band signal light $\lambda_I$ enters the second optical circulator 340 at the input 340a and exits at the input/output 340b. The intermediate band signal light $\lambda_I$ encounters the reflectors 342, 344, 346, where predetermined wavelengths, particularly L band signal light $\lambda_L$, are reflected by the reflectors 342, 344, 346 back into the second optical circulator 340 at the input/output 340b, through the second optical circulator 340 and out through the output 340c. The L band signal light $\lambda_L$ is transmitted along the signal line 142 where the L band signal light $\lambda_L$ is amplified as described above. The ultra-L band signal light $\lambda_{LL}$ is transmitted along the signal line 144 where the ultra-L band signal light $\lambda_{LL}$ is amplified as described above.

In the amplifier 300, the L band signal light $\lambda_L$, now amplified, enters the third optical circulator 380 at the input 380a and exits at the input/output 380b. The L band signal light $\lambda_L$ encounters the reflectors 382, 384, 386, where the L band signal light $\lambda_L$ is reflected by the reflectors 382, 384, 386 back into the third optical circulator 380 at the input/output 380b, through the third optical circulator 380 and out through the output 380c. The ultra-L band signal light $\lambda_{LL}$, now amplified, enters the third optical circulator at the input/output 380b and exits through the output 380c, combined with the L band signal light $\lambda_L$ as the amplified intermediate band signal light $\lambda_I$.

The amplified intermediate band signal light $\lambda_I$ enters the fourth optical circulator 390 at the input/output 390b and exits through the output 390c. The C band signal light $\lambda_C$, now amplified, enters the fourth optical circulator 390 at the input 390a and exits at the input/output 390b. The C band signal light $\lambda_C$ encounters the reflectors 392, 394, 396, where the C band signal light $\lambda_C$ is reflected by the reflectors 392, 394, 396 back into the fourth optical circulator 390 at the input/output 390b, through the fourth optical circulator 390 and out through the output 390c, where the C band signal light $\lambda_C$ combines with the intermediate band signal light $\lambda_I$ as the amplified signal light $\lambda_S$.

In the amplifier 400, shown in FIG. 4, the C band signal light $\lambda_C$, having been amplified in the manner described above, enters the third optical circulator 380 at the input 380a and exits at the input/output 380b. The C band signal light $\lambda_C$ encounters the reflectors 382, 384, 386, where the C band signal light $\lambda_C$ is reflected by the reflectors 382, 384, 386 back into the third optical circulator 380 at the input/output 380b, through the third optical circulator 380 and out through the output 380c. The L band signal light $\lambda_L$, having been amplified in the manner described above, enters the third optical circulator at the input/output 380b and exits through the output 380c, combined with the C band signal light $\lambda_C$ as the amplified intermediate band signal light $\lambda_I$.

The ultra-L band light $\lambda_{LL}$, having been amplified in the manner described above, enters the fourth optical circulator at the input/output 390b and exits through the output 390c. The amplified intermediate band signal light $\lambda_I$ enters the fourth optical circulator 390 at the input 390a and exits at the input/output 390b. The intermediate band signal light $\lambda_I$ encounters the reflectors 392, 394, 396, where the intermediate band signal light $\lambda_I$ is reflected by the reflectors 392, 394, 396 back into the fourth optical circulator 390 at the input/output 390b, through the fourth optical circulator 390 and out through the output 390c, where the intermediate band signal light $\lambda_I$ combines with the ultra-L band signal light $\lambda_{LL}$ as the amplified signal light $\lambda_S$.

Those skilled in the art will recognize that, although three reflectors are shown for each circulator 320, 340, 380, 390, more or less than three reflectors can be used.

Figure 5:
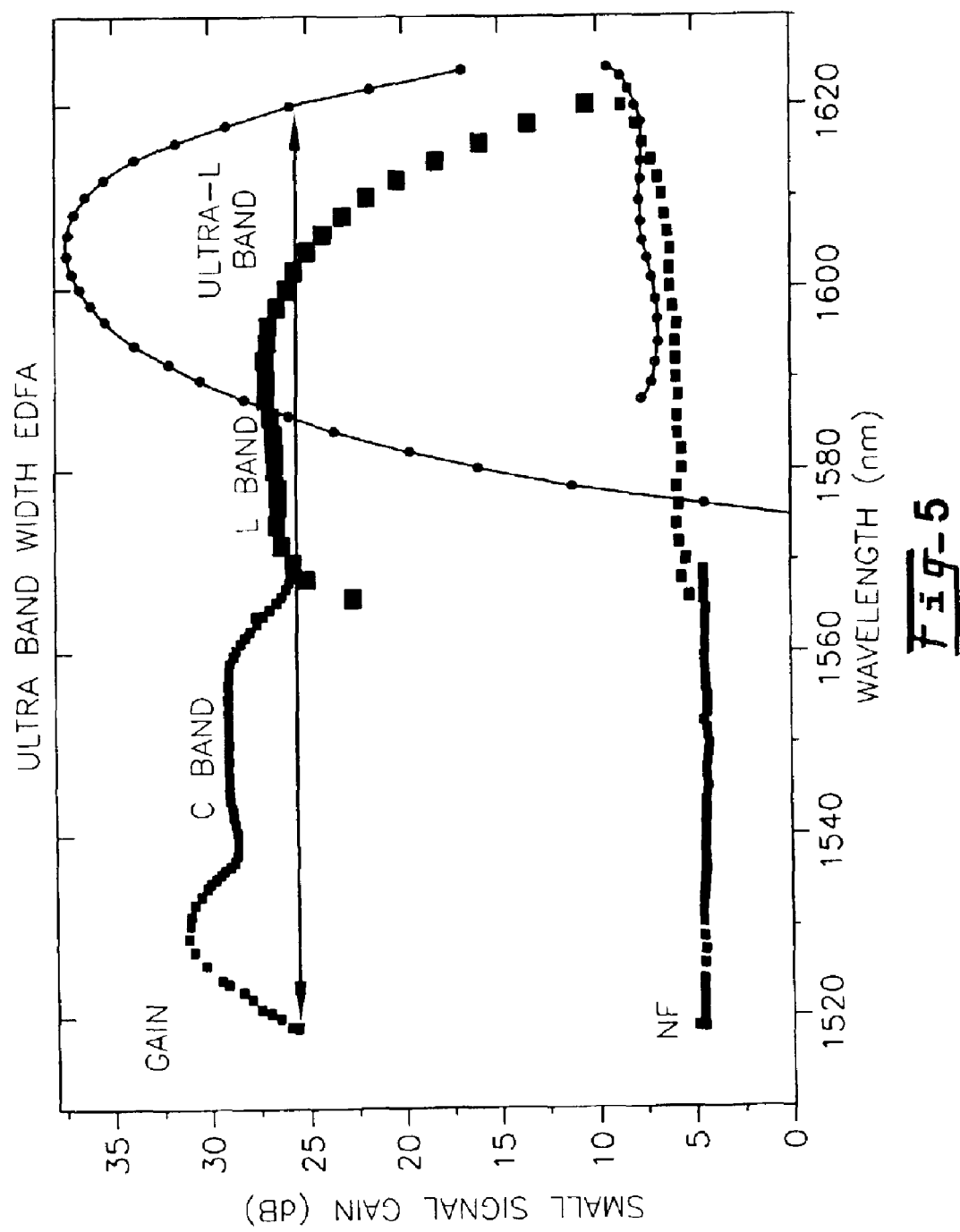
FIG. 5 is a graph showing signal gain and noise vs. wavelength for the optical amplifier according to the first embodiment.

FIG. 5 shows a graph of amplification of a broadband signal light $\lambda_S$ having wavelength between 1520 nm and 1620 nm using the amplifier 100 according to the first embodiment of the present invention having a fifteen meter long erbium doped fiber as the first amplifier portion 130, a sixty-two meter long erbium doped fiber as the second amplifier portion 150, a forty meter long erbium doped fiber as the amplifier section 160a, and an eighty meter long erbium doped fiber as the amplifier section 160b. FIG. 5 shows that significant gains of over 25 dB, with noise figures of less than 7 dB, can be achieved with the present invention.

Although FIGS. 1–4 illustrate splitting a signal light $\lambda_S$ into three separate bands, $\lambda_C$, $\lambda_L$, and $\lambda_{LL}$, with each band being optically amplified separately, those skilled in the art will recognize that the signal light $\lambda_S$ can be split into more than three separate bands, with each band being optically amplified separately. For example, the signal light $\lambda_S$ having wavelengths between 1510 and 1620 nanometers can be split into four separate bands having wavelengths of, 1510–1560 nanometers, 1560–1580 nanometers, 1580–1605 nanometers, and 1605–1620 nanometers, without departing from the spirit and scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A broadband optical amplifier comprising:
   an input having a plurality of optical wavelengths, including optical wavelengths between 1610 and 1620 nanometers;
   a first optical splitter optically connected to the input, the first optical splitter splitting the input into at least a first band signal portion and a second band signal, wherein the first optical splitter comprises the first optical splitter adapted to split the input broadband portion into the first band signal portion and an intermediate signal portion and a second optical splitter adapted to split the intermediate portion into the second band signal portion and a third band signal portion;
   an amplifying portion optically disposed along each of the at least first and second band signal portions optically downstream from the first optical splitter; and
   a first optical combiner optically connected to the at least first and second band signal portions to form an output.

2. The broadband optical amplifier according to claim 1, further comprising an amplifying power source optically connected to each of the amplifying portions.

3. The broadband optical amplifier according to claim 2, further comprising an auxiliary amplifying power source optically connected to the second amplifying portion.

4. The broadband optical amplifier according to claim 1, wherein the amplifier amplifies light having wavelengths in approximately a one hundred nanometer band.

5. The broadband optical amplifier according to claim 4, wherein the one hundred nanometer band includes approximately 1520 nm to 1620 nm.

6. The broadband optical amplifier according to claim 5, wherein gain in the amplifier exceeds 25 dB across the band.

7. The broadband optical amplifier according to claim 1, wherein each of the first and second optical splitters comprises a wavelength division multiplexer.

8. The broadband optical amplifier according to claim 1, wherein each of the first and second optical splitters comprises an optical circulator.

9. The broadband optical amplifier according to claim 1, further comprising a first reflector optically disposed between the amplifying portion in the second band signal portion and the second optical splitter.

10. The broadband optical amplifier according to claim 1, further comprising a first reflector optically disposed between the amplifying portion in the third band portion and the second optical splitter.

11. The broadband optical amplifier according to claim 10, wherein at least one of the amplifying portions comprises first and second amplifying sections.

12. The broadband optical amplifier according to claim 11, further comprising a second reflector optically disposed between the first amplifying section and the second amplifying section.

13. The broadband optical amplifier according to claim 1, wherein the first optical splitter comprises an arrayed waveguide grating.

14. The broadband optical amplifier according to claim 1, wherein the first optical combiner comprises the first optical combiner adapted to combine the at least first and second band signal portions.

15. The broadband optical amplifier according to claim 14, wherein the first optical combiner comprises a wavelength division multiplexer.

16. The broadband optical amplifier according to claim 14, wherein the first optical combiner comprises an optical circulator.

17. The broadband optical amplifier according to claim 1, wherein the first optical combiner comprises an arrayed waveguide grating.

18. The broadband optical amplifier according to claim 1, wherein each of the amplifying portions comprises a rare earth doped medium.

19. The broadband optical amplifier according to claim 18, wherein the rare earth doped medium comprises a fiber.

20. The broadband optical amplifier according to claim 18, wherein the rare earth doped medium comprises a planar waveguide.

21. A method of amplifying a broadband optical signal comprising:
    providing a broadband optical signal having a plurality of optical wavelengths, including
    optical wavelengths between 1610 and 1620 nanometers;
    splitting the broadband optical signal into at least first and second optical signals, wherein splitting the broadband optical signal comprises splitting the broadband optical signal into the first optical signal and an intermediate optical signal and then splitting the intermediate optical signal into second and third optical signals;
    separately amplifying each of the at least first and second optical signals; and
    combining the at least first and second optical signals into an amplified broadband optical signal.

22. The method according to claim 21, combining the at least first and second optical signals comprises combining two of the first, second, and third optical signals to form an intermediate optical signal, and then combining the remaining of the first, second, and third optical signals with the intermediate optical signal.

23. The method according to claim 21, wherein providing the optical input comprises providing a bandwidth of approximately 100 nanometers.

24. The method according to claim 23, wherein providing the optical input comprises providing a bandwidth of between approximately 1520 to 1620 nanometers.

25. The method according to claim 21, wherein separately amplifying the second optical signal comprises reflecting amplified spontaneous emission generated during amplification of the second optical signal and using the reflected amplified spontaneous emission to increase amplification of the second optical signal.

* * * * *